May 15, 1934.   F. H. GILCHRIST   1,958,572
METHOD OF MAKING BUILDING MATERIAL
Original Filed Oct. 21, 1931   5 Sheets-Sheet 1
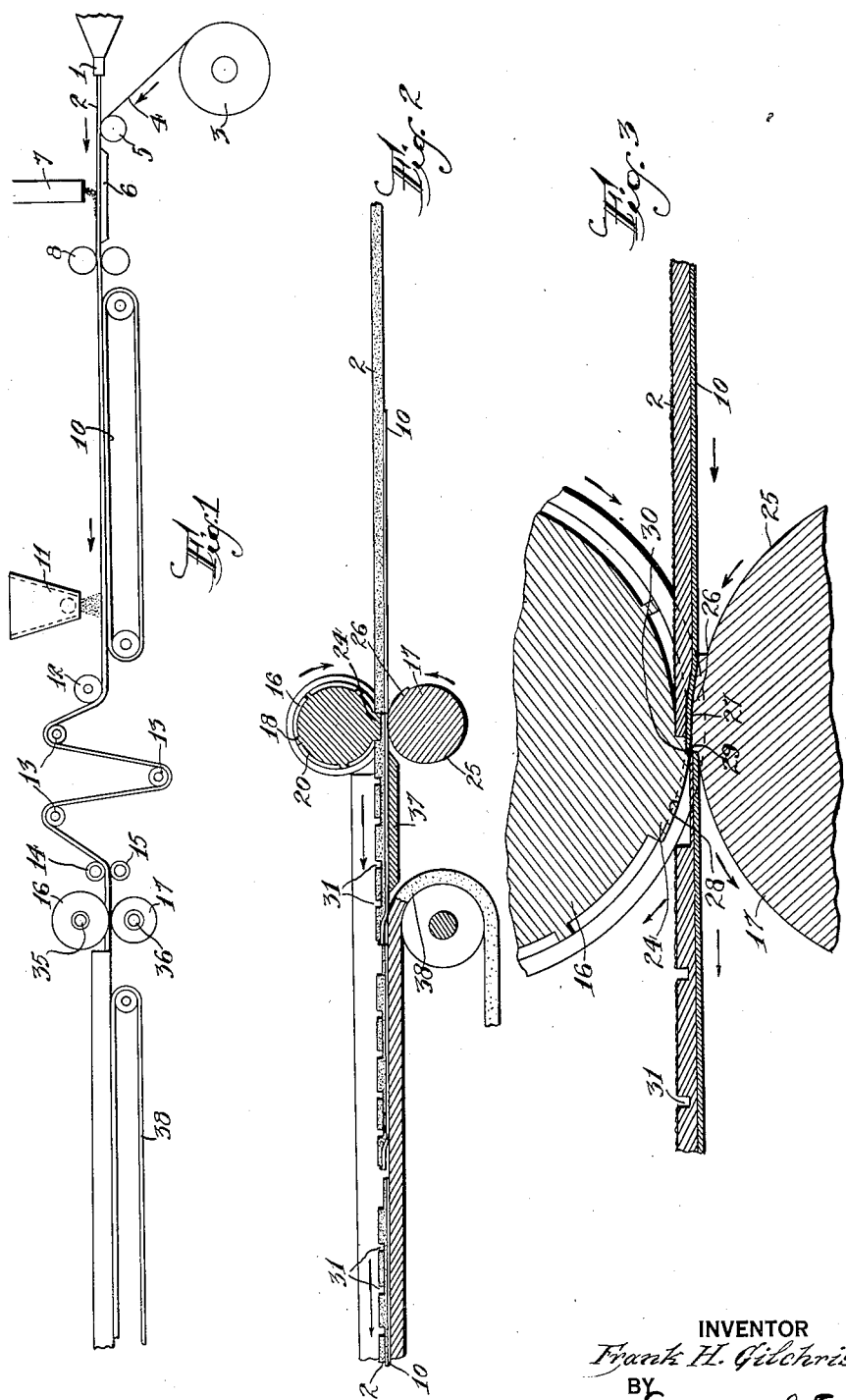
INVENTOR
Frank H. Gilchrist
BY
Samuel Stearman
ATTORNEY May 15, 1934.   F. H. GILCHRIST   1,958,572
METHOD OF MAKING BUILDING MATERIAL
Original Filed Oct. 21, 1931    5 Sheets-Sheet 2
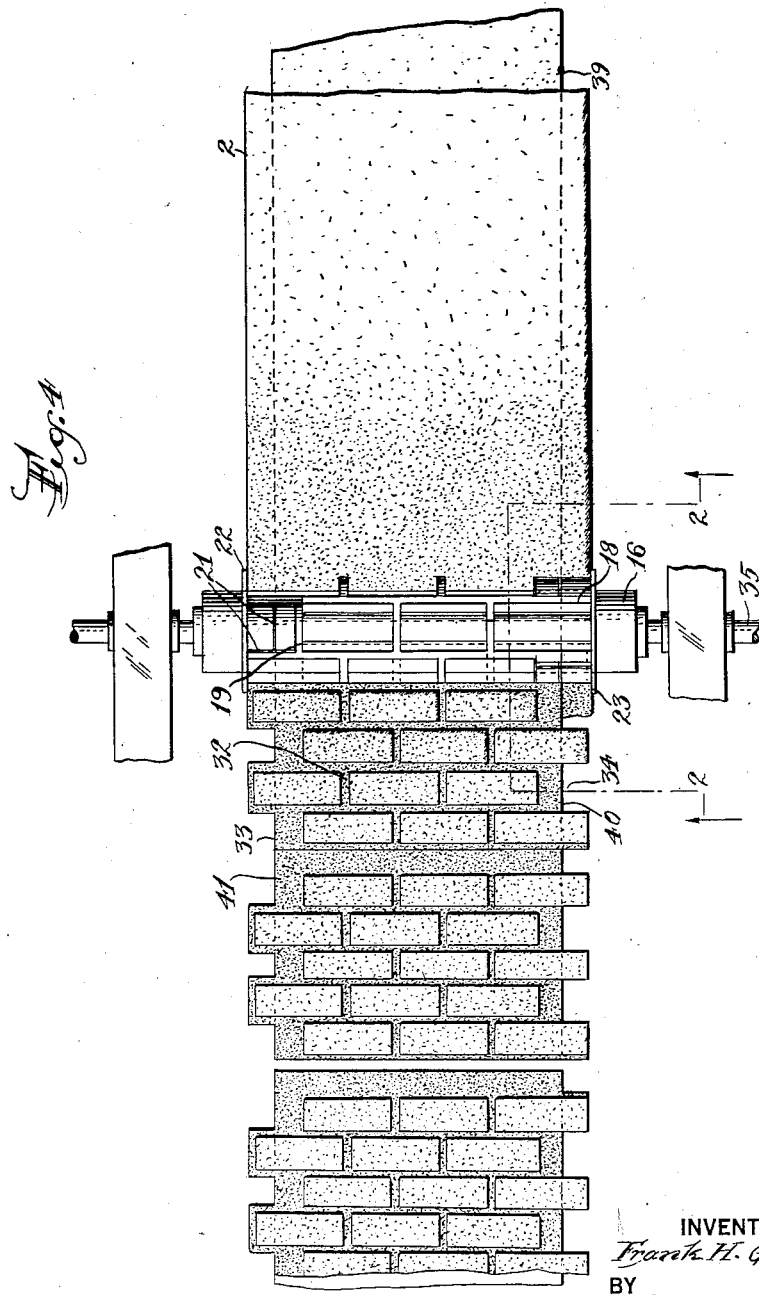
INVENTOR
Frank H. Gilchrist
BY
Samuel Stearman
ATTORNEY May 15, 1934.  F. H. GILCHRIST  1,958,572
METHOD OF MAKING BUILDING MATERIAL
Original Filed Oct. 21, 1931   5 Sheets-Sheet 3
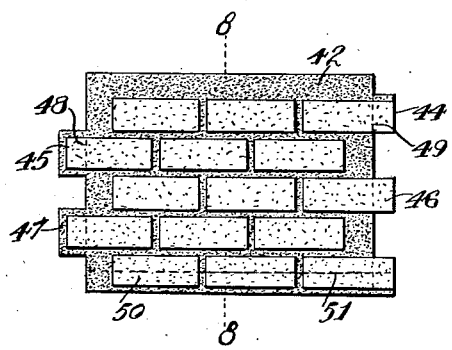
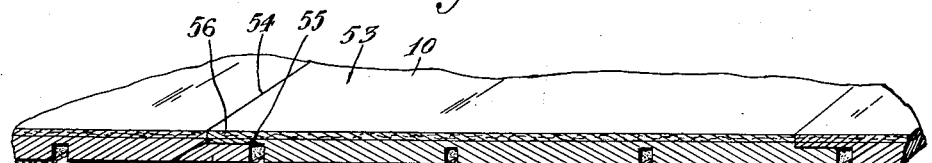
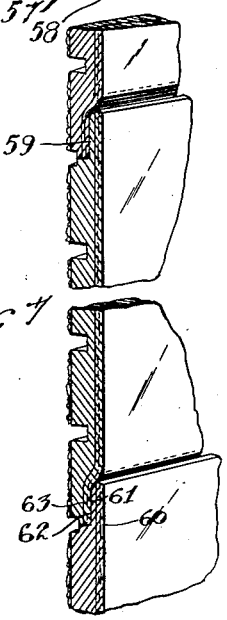
INVENTOR
Frank H. Gilchrist
BY
Samuel Stearman,
ATTORNEY May 15, 1934. F. H. GILCHRIST 1,958,572
METHOD OF MAKING BUILDING MATERIAL
Original Filed Oct. 21, 1931    5 Sheets-Sheet 4
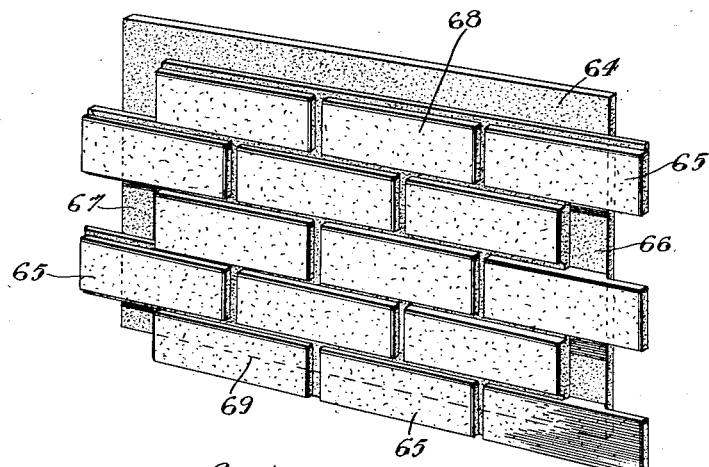
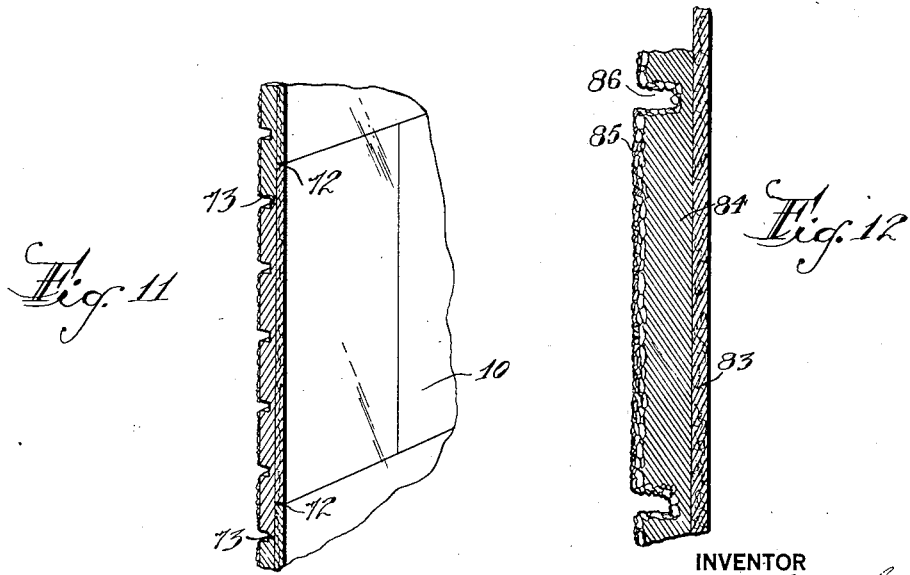
INVENTOR
Frank H. Gilchrist
BY
Samuel Stearman
ATTORNEY Patented May 15, 1934

1,958,572

UNITED STATES PATENT OFFICE 1,958,572

METHOD OF MAKING BUILDING MATERIAL

Frank H. Gilchrist, Bronxville, N. Y., assignor to The Patent and Licensing Corporation, Boston, Mass., a corporation of Massachusetts Original application October 21, 1931, Serial No. 570,115. Divided and this application October 5, 1932, Serial No. 636,315

8 Claims. (Cl. 154—2)

This application is a division of my copending application Serial Number 570,115, filed October 21, 1931.

This invention relates to mastic building materials and to the method of making such materials. The invention relates more particularly to panels to be used for siding in simulation of stone, brick, clapboard, etc.

I have found that mastic material extruded in a layer upon a web of fibrous material, surfaced with granular material of any suitable color, embossed with any desirable pattern and then cut into panels of convenient size, produces a finished product that is admirably adapted to be used as siding in building construction. The mastic is a mixture of bitumen, such as asphalt, with fibrous material and hardening fillers, such as crushed slate, clay, sand, cork, etc., which hardens to a stiff mass upon cooling. An excellent source of material for the preparation of this mastic is the waste material formed in the manufacture of composition roofing. This waste contains asphalt, fibrous material and fillers and can be masticated at elevated temperature to provide a composition suitable for working into the products contemplated by my invention.

The product of my invention has many advantages. It is of waterproof character throughout its construction, and because of the nature of the mastic it is comparatively rigid so that it can be easily handled in relatively large units. The panels are so formed that they will interlock at the joints to provide adequate protection against the weather. The panels are embossed in such a manner as to facilitate the laying thereof and avoid difficulties in alignment. Furthermore, the siding made according to my invention provides a very economical construction material.

Further objects and advantages will appear from the following description of my invention and from the accompanying drawings of which, Figure 1 is a diagrammatic view in elevation of one form of apparatus for carrying out my invention;

Figure 2 is a view partly in cross-section of a portion of the apparatus illustrated in Figure 1 taken along the line 2—2 of Figure 4;

Figure 3 is an enlarged view in cross-section of the embossing and cutting rolls shown in Figure 2;

Figure 4 is a plan view of the apparatus illustrated in Figure 2;

Figure 5 illustrates a plan, one form of a finished panel made in accordance with the invention;

Figure 6 is a fragmentary view in perspective, showing the appearance of the back and horizontal cross-section of a course of panels made according to my invention;

Figure 7 is a similar view showing the back and vertical cross-section of several adjacent courses of panels;

Figure 8 is a vertical cross-section of the element shown in Figure 5 along the line 5—5;

Figure 9 illustrates a modified form of panel made according to my invention;

Figure 10 is a horizontal cross-section of a course of panels of the type illustrated in Figure 9;

Figure 11 is a view similar to Figure 7, of the panels, illustrated in Figure 9;

Figure 12 is an enlarged vertical cross-section of the panels made according to my invention;

Figure 13:
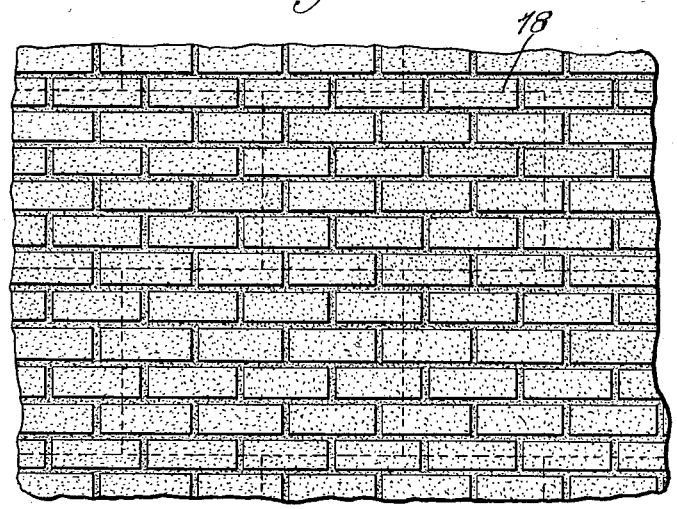
Figure 13 illustrates the appearance of the panels when laid.

Referring to Figure 1, the numeral 1, indicates an extruding device having a flat, wide orifice to enable the mastic material to be extruded in the form of a sheet which may be of a cross-sectional thickness varying from ⅛" to ⅜" more or less. The sheet of mastic is represented by the numeral 2. The numeral 3 indicates a roll of fibrous material which preferably comprises asphalt saturated roofing felt. The sheet of felt 4, is led over an idle roll 5, together with the deposited layer of mastic 2. The combined sheet may then be passed over a table 6, where a coating of weatherproof material, such as blown asphalt of 200 to 220° F. melting point, may be applied from a spout 7. The coating may, if desired, be dispensed with, but is preferably employed in order to enhance the weathering properties of the product and to assist in binding the surfacing granules to the sheet. From the table 6, the sheet passes under a doctoring roll to spread the coating evenly over the surface of the layer of mastic. The sheet is then carried by a belt or other type of conveyor 10, beneath the surfacing hopper 11, from which slate or other granular material is deposited upon the layer of coating. The sheet may then be carried around a press drum 12, to cause the granules to adhere firmly to the surface of the sheet, and then around idle rolls 13. The drums 13 may be either heated or cooled by circulating therethrough a suitable fluid or in any other desired manner in order to bring the sheet to the proper temperature for the embossing operation. The sheet is next led between guiding and feeding rolls 14, 15 and then between the embossing and cutting rolls 16 and 17, better shown in Figures 2, 3 and 4. As shown in Figure 4, the rolls 16 and 17 are designed particularly for the production of mastic slabs or panels simulating, when laid, brick wall construction. These drums are preferably dimensioned to form one panel, as herein described, during each revolution. Accordingly, the drum 16 is formed with a series of narrow ribs 18 running lengthwise of the drum and a plurality of series of cross-ribs 19 around the periphery of the drum. The ribs 18 are spaced at suitable intervals around the periphery of the drum, corresponding to the width of a common brick. Each rib 19 is preferably of an arcuate length corresponding substantially to the distance between adjacent ribs 18. The ribs 19 of one series are staggered in relation to the ribs of the adjacent series, and the several series of ribs 19 are spaced from one another axially of the drum, a distance substantially one half the length of a common brick. The ribs 18 and 19 project outwardly of the peripheral surface of the drum a distance approximating the distance between the face of a common brick and the surface of the mortar in ordinary brick construction. The width of the ribs corresponds to that of an ordinary mortar joint. Cutters 21 are fixed at opposite ends of the drum 16, between alternate rows of ribs 18, the cutters at one end of the drum being peripherally staggered in relation to those at the opposite end thereof. The arrangement of these cutters will depend upon the particular modification of panel desired. As particularly illustrated in Figure 4, the cutters serve to remove the portions indicated by the numerals 33 and 34, along the opposite longitudinal edges of the sheet, at spaced intervals, whereby to form spaced tongues along each edge of the sheet. Numerals 22 and 23 represent circular slitters attached to the periphery of the drum 16 at the outer extremities of the cutters 21. The drum 16 has a boss 24 extending outwardly from the periphery of the drum for a distance greater than that of the ribs 18 and 19. The boss 24 is of substantial arcuate length as compared with the width of the ribs 18 and 19. The drum 17 has a boss 26 substantially similar to the boss 24 of the drum 16. The drums 16 and 17 rotate in relation to each other in the directions indicated by the arrows in Figures 2 and 3, so that the edges 29 and 30 of the bosses 26 and 24 respectively meet once during each revolution of the drums. The ribs 18, 19 are designed to compress the mastic layer to a fraction of its original thickness and simultaneously cause the surfacing material to become completely embedded in the mastic, thereby bringing to the surface the dark or contrasting color of the mastic.

As shown in Figure 4, the sheet, in its passage between the drums 16 and 17 is embossed with a design resembling brick siding, each complete revolution of the drums producing a panel having a series of rows of bricks embossed thereon. Successive panels are cut from the sheet by means of the confronting edges 29 and 30 of the bosses 24 and 26. The boss 26 serves to under-emboss or crimp the leading end of the sheet after each successive panel is cut therefrom, and the boss 24 serves to emboss the upper surface of the panel at its rear end, as clearly shown in Figure 3. Thus, grooves 31 are formed in the mastic layer by means of the ribs 18 and the grooves 32 are formed by means of the ribs 19. The cut-outs 33, 34 are made by means of the cutters 21. The edges of the sheet are trimmed by means of the slitters 22 and 23. The drums 16 and 17 are mounted on suitable shafts, 35, 36, and are driven by means of any suitable source of power. The panels issue from the embossing drums onto a table 37 from which they may be led away by a conveyor belt 38. It is evident that if other designs are desired the pattern on the embossing rolls 16 and 17 can be changed. Moreover the embossing can be done with a stamping machine instead of rolls.

As shown in Figure 4, the backing sheet of felt is of less width than the layer of mastic. In this form, the inner edges 40 and 41 of the cut-outs 33 and 34, will be coincident with the longitudinal edges 39 of the felt backing sheet. The finished panel made as above described will appear as shown in Figure 5. The upper horizontal margin 42 comprises felt overlaid with mastic as shown more clearly at 43 of Figure 8. The portions 44, 45, 46, 47, which extend beyond the lateral edges of the main portion of the panel comprise mastic without any felt beneath, the lateral edges of the felt base being indicated by the dotted lines 48 and 49. The lower margin 50 of the panel which has been under-embossed or crimped up to the line 51, will also comprise felt overlaid with the mastic as shown in Figure 8. When these panels are laid in place on a wall, the felt backing will completely underlie the mastic material, as shown in Figure 6. In each horizontal course, the felt backing of adjacent panels thus form a butt-joint, as indicated at 54, while the mastic material of each panel forms a lap-joint, as indicated at 55 with its neighboring panel. The lapped portions of each panel will consist of a layer of felt 56, and a thin layer of mastic 57. The lapping portion of each panel at the joint will consist of a comparatively thick layer 58 of mastic only. Between successive courses there will be a lap joint comprising two layers of felt and two layers of mastic as shown at 59, in Figure 7. The lapped portions will consist of a layer of felt 60, and a thin layer of mastic 61, while the lapping portion will consist of a layer of felt 62 and a comparatively thick layer of mastic 63. It will thus be seen that the marginal edges of the panels are embossed to such relative depth that when the panels are laid in place, the brick simulating surfaces of the panels all lie in substantially the same plane.

In the modified form of panel shown in Figure 9, the portions 64, 66 and 67, which will be lapped when the panel is laid in place consist of bare felt while the lapping portions 65 comprise mastic only. The terminal edge of the felt backing at the bottom of the panel is shown at 69. In producing this type of panel the mastic may be embossed separately and then affixed to the felt backing. In this embodiment of the invention the felt joints 70 in each horizontal course will be offset with respect to the mastic joints 71. The same is true of the felt joints 72 and the mastic joints 73 between adjacent panels of successive courses.

Figure 14:
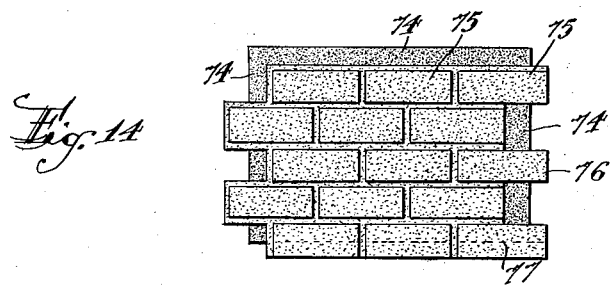
Figure 14 illustrates still another modification of a panel made according to my invention.

The modification shown in Figure 14, is substantially like the panel shown in Figure 5, with the exception that all portions of the panel have felt underlying the mastic. It is obvious that this type of panel can also be produced by means of the apparatus previously described. The lap portions 74 will be embossed so that they are of less thickness than the simulated mortar joints 75 and the brick simulating areas 76 are of greater thickness than the simulated mortar joints. The panel will be underembossed or crimped up to the line 77 to provide the lapping portion to overlie the upper horizontal lapped areas 74 of subjacent panels when laid.

Figure 15:
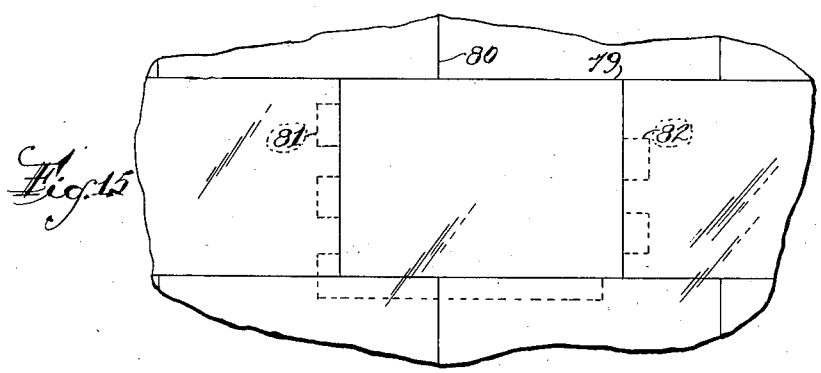
Figure 15 is a back view of the appearance, as laid, of the panels shown in Figures 5, 9 and 14.

All the forms of panels described and shown, will appear as shown in Figure 13 when laid in place upon a wall. The dotted lines 78 represent the joints between the felt backing sheets. The joints between the mastic on the exposed face of the panels in each horizontal course will always occur along staggered mortar joints. The exposed joints between adjacent courses will also occur at the mortar joints, thereby concealing the joints. Looking at the back of the panels as they appear when laid, the felt joints will appear as continuous lines as shown at 79 and 80 in Figure 15, while the mastic joints will appear along the dotted lines 81, 82.

The cross section of the main body of a panel made according to any one of the three modifications shown and described will appear as shown in Figure 12. The layer of felt 83 has a thick layer of mastic 84 united thereto. The granular material 85 is partially imbedded in the brick simulating areas of the panel, and is completely embedded along the grooves 86. Where coating material is applied to the surface of the mastic it will appear as a thin layer in which the granular material is partially embedded on the brick-simulating surfaces and completely imbedded in the grooves simulating mortar joints. It is apparent that the surfacing material may be applied only to the brick-simulating areas by embossing the mastic directly and then cutting panels from the sheet after which the granular material may be applied by contacting it face downward with a layer of granular material and exerting pressure to cause the granular material to adhere only to the flat surfaces with which it comes into contact.

It will be understood that the surfacing material may be of any desirable color in order to represent various colored bricks. The coating may also be applied after the embossing operations if so desired. The coating may be applied only to the brick-simulating surfaces so that when granular material is applied it will adhere only to the coated surfaces, leaving the simulated mortar joints unsurfaced.

Instead of using a backed sheet of felted fibrous material saturated by immersion in a bath of molten asphalt, I may employ, in lieu thereof, a sheet of composition board prepared from a mixture of fibrous material and an aqueous dispersion of bitumen and sheet on a conventional paper making machine in accordance with known methods of making such sheets or boards. It is apparent that other materials, in board or sheet form, may be used as the backing for the mastic layer.

If it is desired to produce panels without the felt backing the mastic may be extruded and passed through compression rollers alone and then subjected to slitting and embossing operations or embossed and then slitted. Various other modifications falling within the scope of the present invention will appear to those skilled in the art.

I claim as my invention:

1. The method of making siding elements comprising subjecting a sheet of bituminous mastic material to embossing, whereby a design of desirable configuration is impressed upon the surface thereof, cutting the sheet into elements of suitable size, crimping one face of the element at one end and embossing the opposite face at the opposite end.

2. The method of producing siding panels simulating brick which comprises subjecting a sheet of bituminous mastic material to an embossing operation whereby to form a design representing a gang of bricks separated by mortar joints, cutting the lateral edges of the sheet along staggered lines conforming to the shape of the bricks and severing the sheet into panels of suitable size.

3. The method of producing siding panels from a sheet of bituminous mastic material which comprises, embossing a brick simulating design on a face of the sheet, cutting the lateral edges of the sheet along staggered lines conforming to the shape of the bricks, cutting the sheet into panels of suitable size, crimping one face of the panel at one end and embossing the opposite face at the opposite end.

4. The method of producing building elements comprising, uniting a thick layer of bituminous mastic material to a base of felted fibrous material to form a sheet, embossing a design of suitable configuration on the face of said mastic, cutting the sheet into elements of suitable size, crimping one face of the elements at one end and embossing the opposite face at the opposite end.

5. The method according to claim 4 in which a design simulating a gang of bricks is embossed on the face of said mastic material.

6. The method according to claim 4 in which a design simulating a gang of bricks separated by mortar joints is embossed on the face of said mastic material and the brick-simulating surfaces are covered with coarse granular material.

7. The method of producing building elements comprising uniting a thick layer of bituminous mastic material to a base of felted fibrous material to form a sheet, embossing the face of said mastic with a design simulating a gang of bricks spaced with mortar joints, covering the brick-simulating surfaces with coarse granular material, severing the sheet into elements each of which contains a plurality of rows of brick-simulating surfaces, crimping one face of said elements at one end and embossing the opposite face of said elements at the opposite end.

8. The method according to claim 7 in which the lateral edges of said sheet are cut along staggered lines conforming to the shape of the bricks.

FRANK H. GILCHRIST.